S. M. COLMAN.
INDICATION OF THE SPEED OF MOVING VEHICLES.
APPLICATION FILED MAY 24, 1909.
1,057,938.
Patented Apr. 1, 1913.
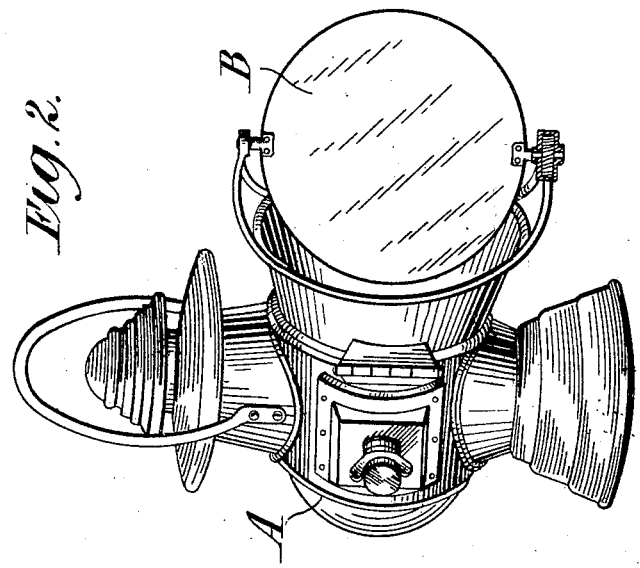
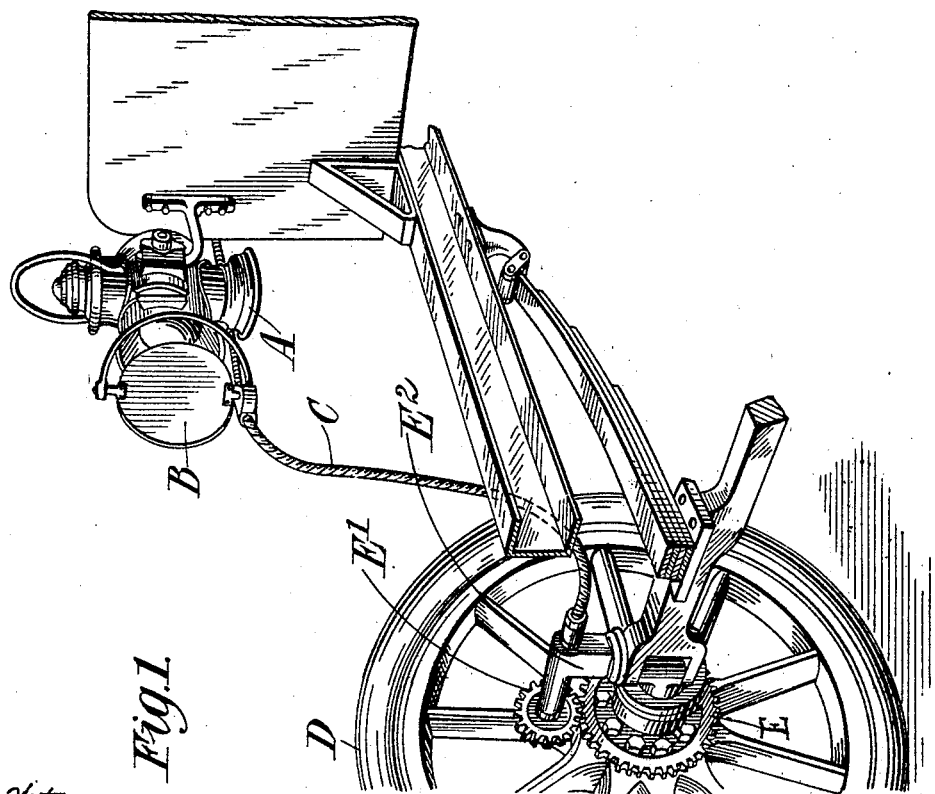

UNITED STATES PATENT OFFICE.

STUART MILL COLMAN, OF LONDON, ENGLAND.

INDICATION OF THE SPEED OF MOVING VEHICLES.

1,057,938.  Specification of Letters Patent.  Patented Apr. 1, 1913.

Application filed May 24, 1909. Serial No. 498,077.

*To all whom it may concern:*

Be it known that I, STUART MILL COLMAN, A. M. I. C. E., a subject of the King of England, residing at London, in England, have invented certain new and useful Improvements in the Indication of the Speed of Moving Vehicles, of which the following is a specification.

This invention relates to the indication of the speed of moving vehicles the object being to enable a person not on the vehicle to ascertain both the speed of the moving vehicle and whether it is continuing at an even pace or increasing or decreasing its speed.

It is well known that vehicles have been provided with devices to show to the occupant the speed at which the vehicle is traveling and it has also been proposed to sound a bell or other alarm at the conclusion of say every mile traversed whereby the occupant may compute the speed, but according to this invention the vehicle carries a device that gives to an outside observer a visible signal every time the vehicle has traversed a predetermined distance, so that such observer can by timing the intervals between the signals ascertain the speed of the vehicle.

One form of apparatus adapted to measure the speed of vehicles according to this invention is shown in the accompanying drawings in which:—

Figure 1 is a perspective view showing one of the steering wheels of a motor-car and the method of applying the apparatus: Fig. 2 shows on a larger scale a lamp with an indicating device attached.

Like letters indicate like parts throughout the drawings.

Pivoted in front of a lamp A that may be attached in front of the dashboard of the vehicle is a disk B, arranged to rotate on a line approximately parallel with the plane of the faces thereof. The disk is geared by any suitable means, for instance by a worm and worm-wheel, to a flexible shaft C. This shaft receives motion from the steering wheel D of the vehicle by means of a toothed wheel E that is secured to the steering wheel and a smaller wheel E' that meshes with the wheel E. The wheel E' is carried by a spindle that is supported in a bearing E² and the spindle may be connected direct to the flexible shaft C. The disk B may be painted white on both sides or faces so that during the day every half revolution will be easily counted as the full face of the disk is presented to the observer. The disk is moreover of such dimensions as to cover the lens of the lamp and consequently at night the rays of the lamp are intercepted at every half revolution. It will be easily seen that the speed at which the vehicle is traveling can be readily ascertained by an observer who times the intervals between so many half or complete revolutions, provided he knows the number of revolutions that indicate a given distance traversed. To avoid counting a number of signals, however, the apparatus may be arranged to give signals with a comparatively long interval between them so that all that is necessary is to time, by means of an ordinary stop watch, the interval between two or more consecutive signals. A convenient number of signals for this purpose may be 30 or better still 32 to the mile. If the latter number be used 4 signaled intervals will then correspond to a furlong. Also 32 signals to the mile make a convenient division for the kilometer.

Instead of the disk being constantly rotated it may be moved intermittently, if desired, and it will be understood that various alterations may be made in details of construction without departing from the spirit of this invention.

One considerable advantage in employing a few signals per mile and timing the intervals between them instead of a number of signals compared against a given period of time is that the observer can give the whole of his attention to the signals, whereas with a given time limit the stop-watch would need to give some signal at the close of the time limit or a second person would be required for this purpose, unless the operator divided his attention between the signals and the watch. Stop-watches giving a direct reading in miles per hour, or graduated to give a reading after a certain number of seconds have elapsed are well known.

The device may be used for any form of moving vehicle and may be actuated from the driving shaft of a motor vehicle or one of the road wheels of a motor or other vehicle in order that the police may be able to ascertain with certainty the speed of travel of any vehicle.

What I claim as my invention and desire to secure by Letters Patent is:—

A speed indicating device for automobiles, comprising a lamp, brackets having journal boxes therein connected to the lamp, a disk having spindles connected to its edge journaled in said boxes, a worm-wheel connected to one of said spindles, a worm journaled in one of the brackets meshing with the worm-wheel, gearing connected to one of the wheels of the automobile, and a flexible shaft connected to said worm and the gearing; substantially as described.

In testimony whereof I have signed my name to this specification in the presence of two subscribing witnesses.

STUART MILL COLMAN.

Witnesses:
WM. JNO. TENNANT,
HARRY B. BRIDGE.